United States Patent
Ma (10) Patent No.: US 6,529,093 B2
(45) Date of Patent: Mar. 4, 2003

(54) MICROELECTROMECHANICAL (MEMS) SWITCH USING STEPPED ACTUATION ELECTRODES

(75) Inventor: Qing Ma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/900,614

(22) Filed: Jul. 6, 2001

(65) Prior Publication Data

US 2003/0006858 A1 Jan. 9, 2003

(51) Int. Cl.[7] ................................................. H01P 1/10
(52) U.S. Cl. ........................ 333/101; 333/105; 333/262
(58) Field of Search ............................... 333/262, 101, 333/105; 200/181; 361/233

(56) References Cited

U.S. PATENT DOCUMENTS

| | | | |
|---|---|---|---|
| 5,278,368 A | * 1/1994 | Kasano et al. | ............. 200/181 |
| 5,544,001 A | * 8/1996 | Ichiya et al. | ............. 361/233 |
| 5,619,061 A | * 4/1997 | Goldsmith et al. | ......... 257/528 |
| 6,127,744 A | * 10/2000 | Streeter et al. | ............ 307/125 |
| 6,160,230 A | * 12/2000 | McMillan et al. | .......... 200/181 |
| 6,307,452 B1 | * 10/2001 | Sun | ............................. 333/262 |

* cited by examiner

*Primary Examiner*—Robert Pascal
*Assistant Examiner*—Dean Takaoka
(74) *Attorney, Agent, or Firm*—Blakely, Sokoloff, Taylor & Zafman LLP (57) ABSTRACT

A microelectromechanical (MEMS) switch is described. The switch comprises a cantilever beam having a proximal end and a distal end. The cantilever beam is supported by its proximal end above a substrate by a raised anchor. An intermediate actuation electrode is placed beneath the cantilever beam and is separated from the bottom of the cantilever beam by a narrow gap. Finally, a contact pad or transmission line is placed beneath the cantilever beam and separated from the bottom of the cantilever beam by a larger gap.

27 Claims, 8 Drawing Sheets

MICROELECTROMECHANICAL (MEMS) SWITCH USING STEPPED ACTUATION ELECTRODES

TECHNICAL FIELD OF THE INVENTION

This invention relates to microelectromechanical system (MEMS) switches, and more particularly, to a MEMS switch using stepped actuation.

BACKGROUND OF THE INVENTION

The use of microelectromechanical (MEMS) switches has been found to be advantageous over traditional solid-state switches. For example, MEMS switches have been found to have superior power efficiency, low insertion loss, and excellent electrical isolation. However, for certain high-speed applications such as RF transmission/receiving, MEMS switches are in general too slow for many applications. This is primarily due to the speed of a MEMS switch being limited by its resonance frequency. To improve the speed of the MEMS switch, the stiffness of the MEMS structure must be increased. However, stiff structures require higher actuation voltages for the switching action to occur.

One possible solution is to simply reduce the gap between the structure and the actuation electrode. However, this is problematical because this will degrade electrical isolation.

BRIEF DESCRIPTION OF THE FIGURES

The invention is best understood by reference to the figures wherein references with like reference numbers generally indicate identical, functionally similar, and/or structurally similar elements. The drawing in which an element first appears is indicated by the leftmost digit(s) in the reference number in which.

DETAILED DESCRIPTION OF THE PREFERRED EMBODIMENTS

Embodiments of a MEMS switch are described in detail herein. In the following description, numerous specific details are provided in order to provide a thorough understanding of embodiments of the invention. One skilled in the relevant art will recognize, however, that the invention can be practiced without one or more of the specific details, or with other methods, materials, components, etc. In other instances, well known structures, materials, or operations are not shown or described in detail to avoid obscuring aspects of various embodiments of the invention. Furthermore, it is understood that the various embodiments shown in the figures are illustrative representations, and are not necessarily drawn to scale.

Reference throughout the specification to "one embodiment" or "an embodiment" means that a particular feature, structure, material, or characteristic described in connection with the embodiment is included in at least one embodiment of the present invention. Thus, the appearances of the phrase "in one embodiment" or "in an embodiment" in various places throughout the specification are not necessarily all referring to the same embodiment. Furthermore, the particular features, structures, materials, or characteristics may be combined in any suitable manner in one or more embodiments.

In general, the electrostatic actuation force between two parallel plate electrodes is given by the equation:

$$F = AV^2/2d^2$$

where is the electrical permeability of air, A is the overlapping area of the electrodes, d is the gap distance, and V is the actuation voltage. As seen from the above, to maintain the same actuation force, one can reduce the actuation voltage by reducing the gap distance.

Prior art cantilever and bridge beam based capacitive shunt and metal/metal contact MEMS switches are shown in FIGS. 1–4. In the simplest type of MEMS switch, in FIG. 1, a cantilever capacitive shunt switch 101 is shown in the "off" position and the "on" position. The switch 101 includes an actuation electrode 103, a dielectric layer 105 formed atop the actuation electrode 103, and a cantilever beam 107. The cantilever beam has one end secured to an anchor 109 that is in turn anchored to a substrate 111. A distance d separates the second end of a cantilever beam 107 from the actuation electrode 103 and dielectric layer 105. In the "off" position, the cantilever beam 107 is not in contact with the dielectric 105. Typically, in this type of switch, the actuation electrode 103 is also part of a transmission line that carries electrical signals. In the "on" position, the cantilever beam 107 is attracted to the actuation electrode 103 by electrostatic forces when a voltage is carried on the actuation electrode 103. The "top electrode" formed by the cantilever beam 107 and the "bottom" actuation electrode 103 are separated by the dielectric layer 105.

Figure 1:
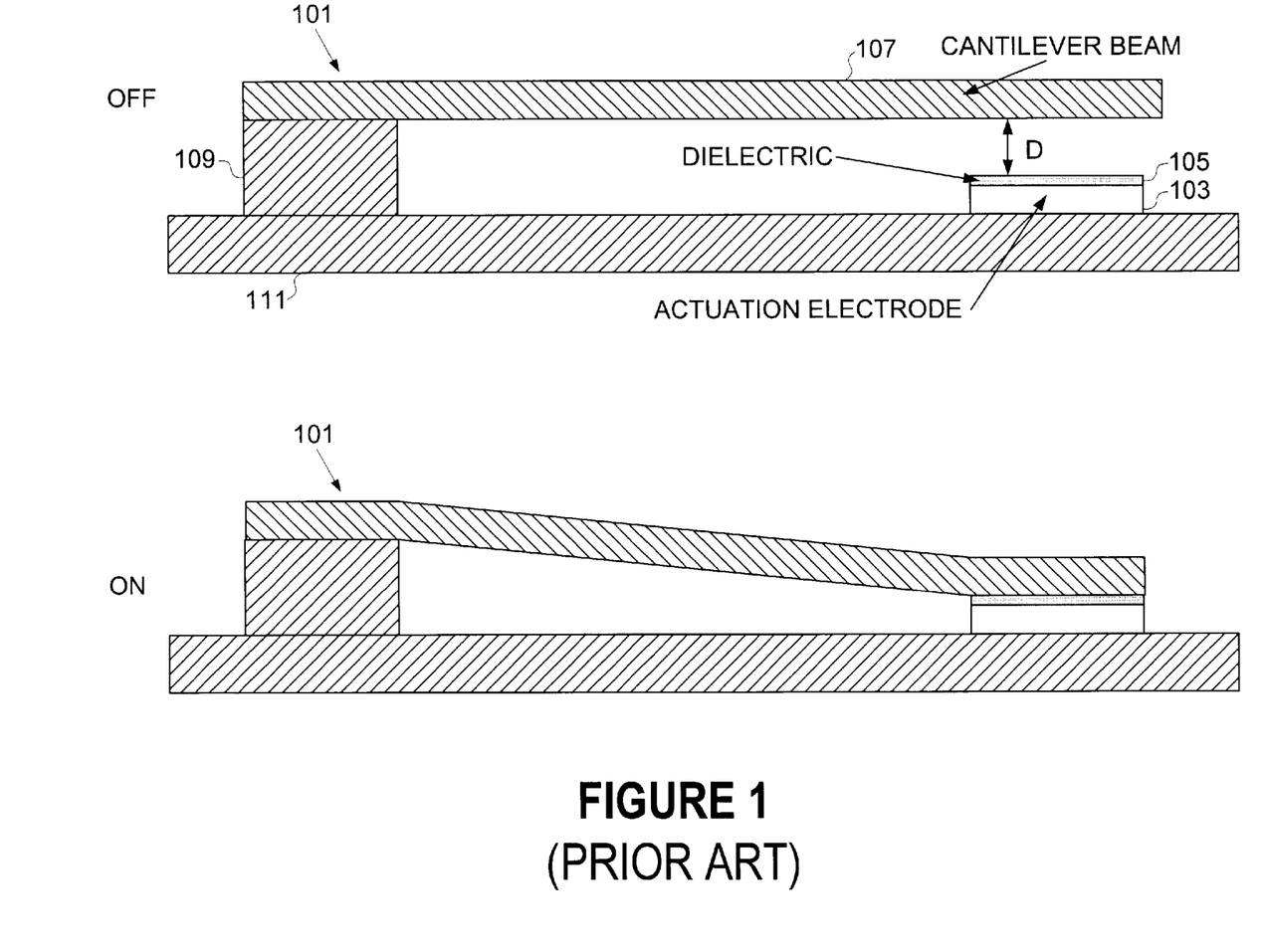
FIG. 1 illustrates a prior art cantilever capacitive shunt MEMS switch.
Figure 2:
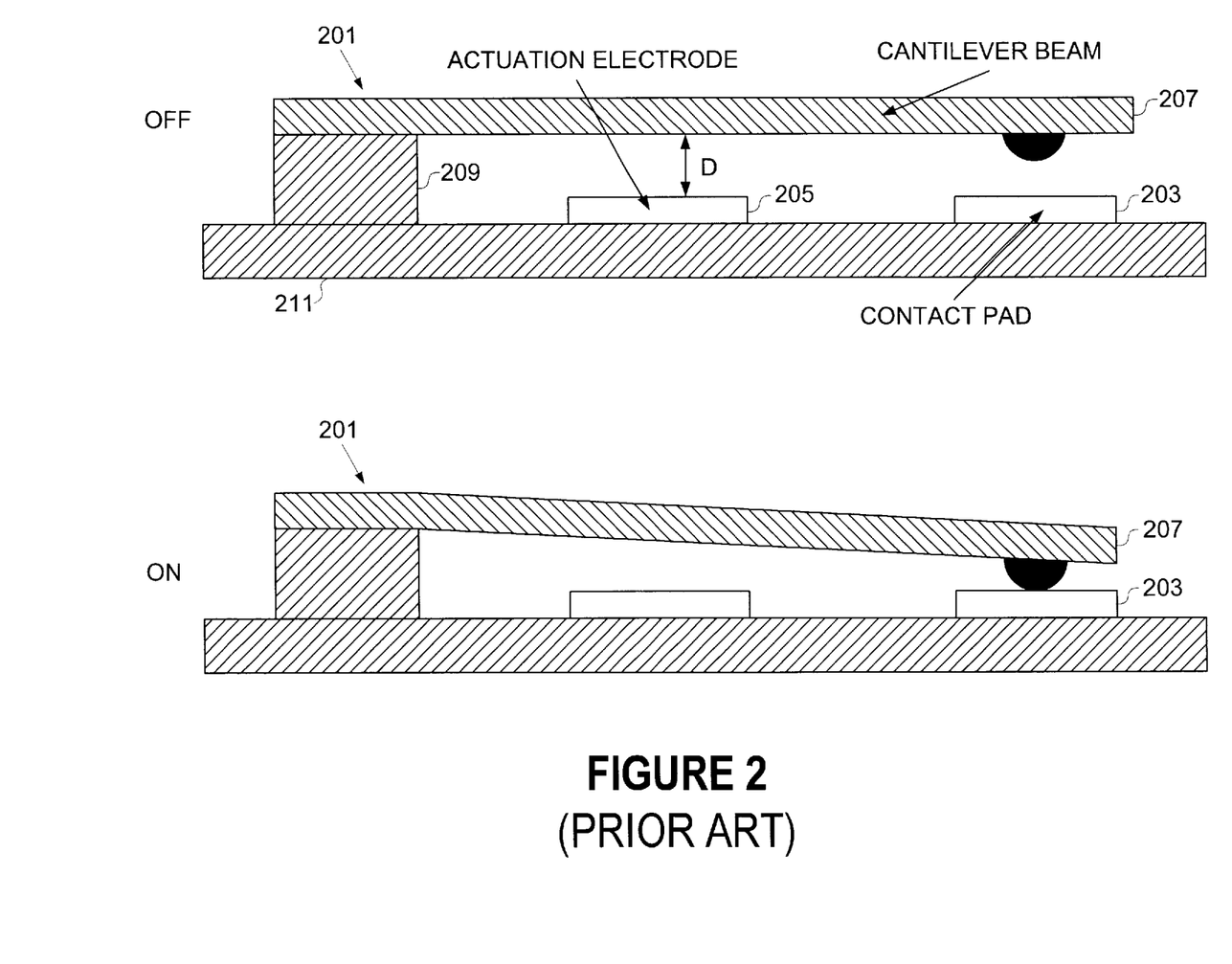
FIG. 2 illustrates a prior art cantilever metal/metal contact MEMS switch.

Turning to FIG. 2, a prior art cantilever metal/metal contact MEMS switch 201 is shown. The contact switch 201 includes a contact pad 203, an actuation electrode 205, and a cantilever beam 207. One end of the cantilever beam 207 is connected to an anchor 209 that is fixed to a substrate 211. In operation, the actuation electrode 205 is activated with a voltage, which creates an electrostatic attraction between the actuation electrode 205 and the cantilever beam 207. This causes the cantilever beam 207 to deform downward into contact with the contact pad 203.

Figure 3:
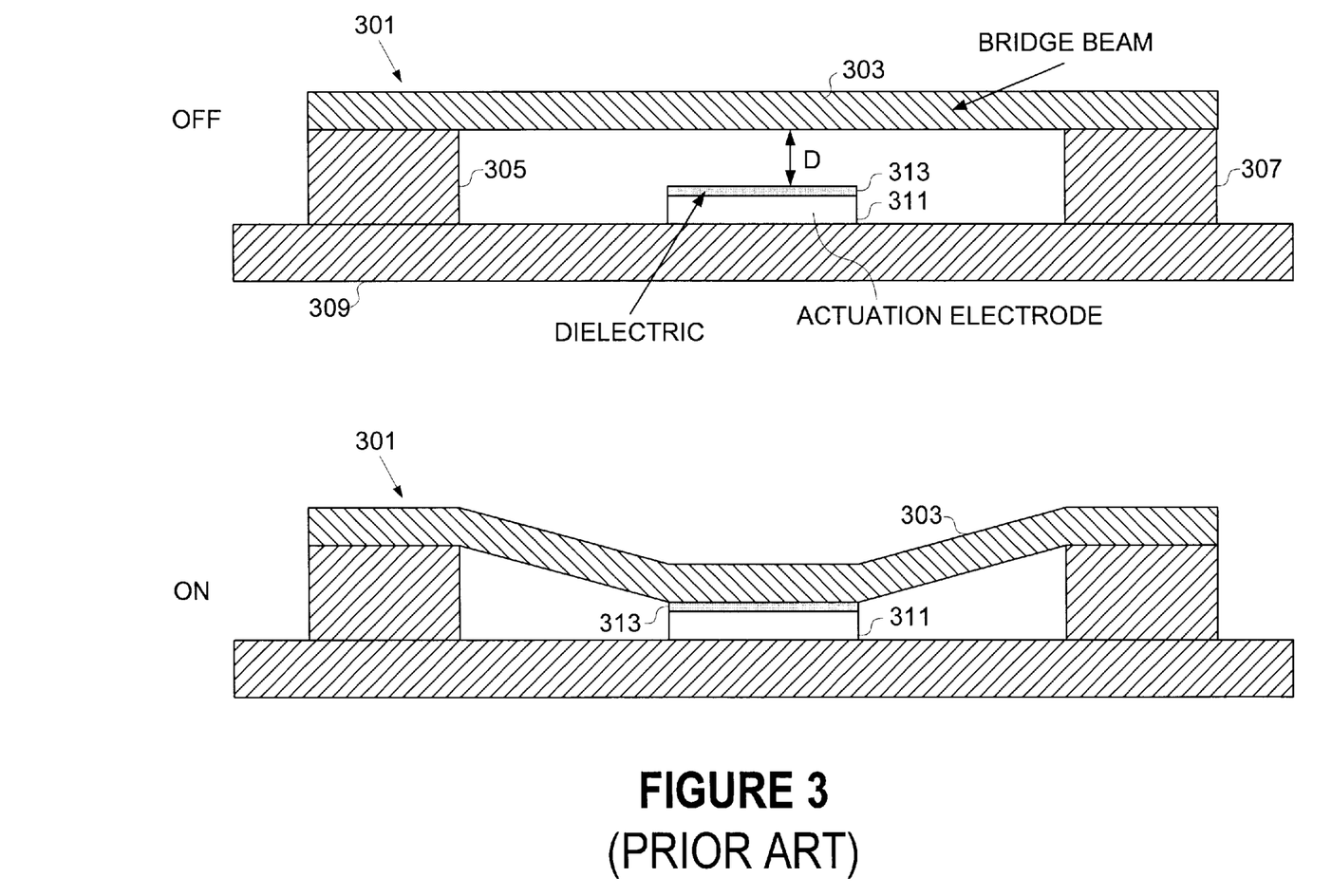
FIG. 3 illustrates a prior art bridge beam capacitive shunt MEMS switch.

Turning to FIG. 3, a prior art bridge beam capacitive shunt switch 301 is shown. The switch includes a bridge beam 303 suspended at its ends by anchors 305 and 307. The anchors 305 and 307 are attached to a substrate 309. Located underneath the bridge beam 303 and between the anchors 305 and 307 is an actuation electrode 311. Formed atop of the actuation electrode 311 is a dielectric layer 313. In the "off" position, the bridge beam 303 is suspended over the dielectric layer 313 and actuation electrode 311. In the "on" position, a voltage is applied to the actuation electrode 311 which causes electrostatic forces to attract the bridge beam 303 into contact with the dielectric layer 313.

Figure 4:
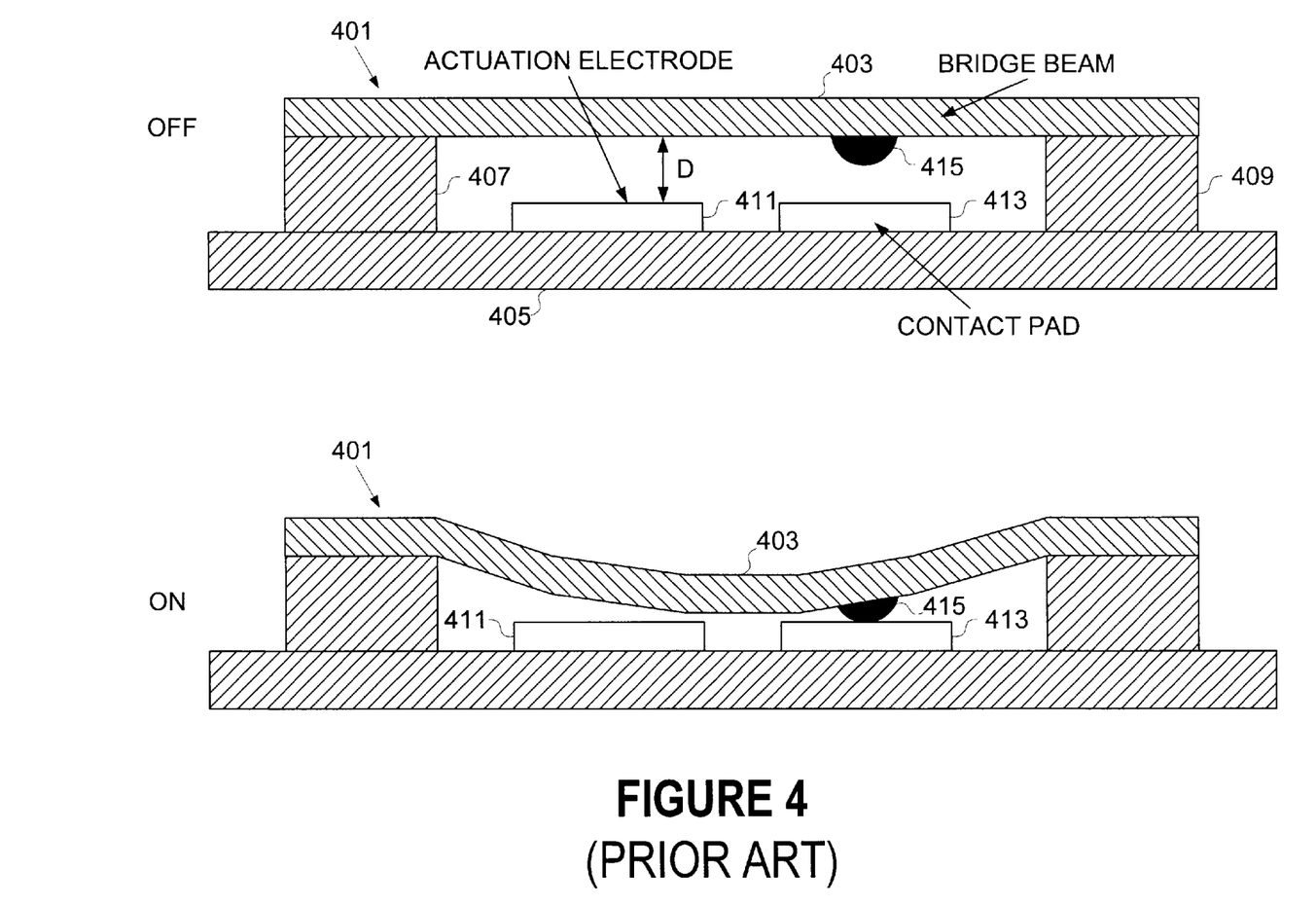
FIG. 4 illustrates a prior art bridge beam metal/metal contact MEMS switch.

Turning to FIG. 4, a bridge beam metal/metal contact MEMS switch 401 is shown. The switch 401 includes a bridge beam 403 that is suspended above a substrate 405 by anchors 407 and 409. An actuation electrode 411 is disposed underneath the bridge beam 403 in between the anchor supports 407 and 409. Further, a contact pad 413 is also disposed underneath the bridge beam 403 and between the anchor supports 407 and 409. In the "off" position, the bridge beam 403 is suspended above the actuation electrode 411 and the contact pad 413. In the "on" position, a voltage is applied to the actuation electrode 411 that causes electrostatic forces to draw the bridge beam 403 downward so that it contacts the contact pad 413. In some embodiments, the bridge beam 403 has a contact button 415 that is used for contacting the contact pad 413.

The present invention modifies the prior art MEMS switches shown in FIGS. 1–4 through the use of intermediate actuation electrodes. Specifically, turning to FIG. 5, a switch 501 formed in accordance with the present invention is shown. The switch 501 includes a cantilever beam 503, a transmission line 505, an intermediate actuation electrode 507, and their corresponding dielectric layers 509 and 511. The dielectric layers 509 and 511 serves to prevent short circuiting when the switch 501 is activated. The cantilever beam 503 has one end (the proximal end) secured to an anchor 513. The anchor in turn is secured to a substrate 515. Typically, the cantilever beam 503 and the anchor 513 are formed from polysilicon. Alternative materials may be used, but should preferably be easily formed using semiconductor processes and be conductive, such as copper, aluminum, or gold. Further, although not shown, the cantilever beam 503 is electrically connected to other circuitry that is selectively connectable to the transmission line 505 by means of the switch 501. In other words, the switch connects the transmission line to other circuit devices when activated. Typically, the circuit devices are also formed on or in the substrate. Moreover, the term transmission line as used herein refers to any conductive device used for carrying electrical signals. Examples include, without limitation, metal interconnects and the like.

Figure 5A:
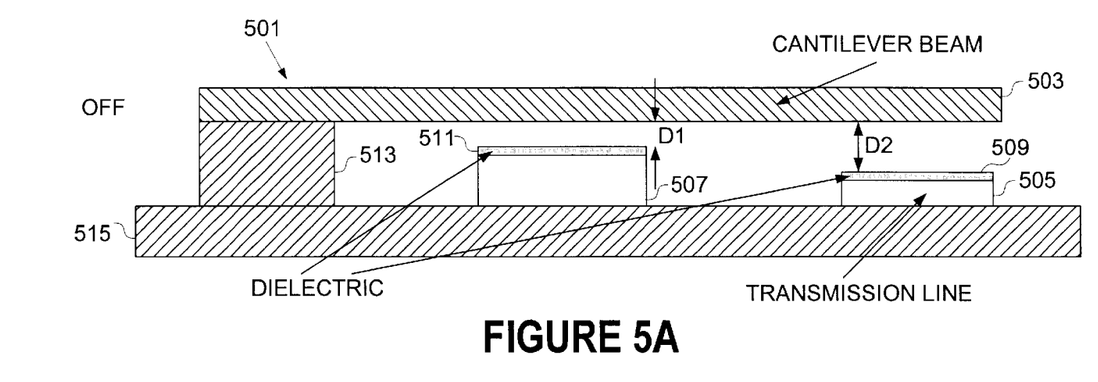
FIGS. 5A–C illustrates a cantilever capacitive shunt MEMS switch formed in accordance with the present invention.

The substrate 515 is typically a semiconductor substrate (e.g. a silicon wafer). Alternatively, the substrate 515 may be an epitaxial silicon layer. Still alternatively, the substrate 515 may be a dielectric material. Thus, the term substrate as used herein means an underlying material that can serve as a support for the anchor 513.

The distal end of the cantilever beam 503 is left unsupported and is free to move downwardly. However, in its undisturbed state, the cantilever beam 503 is substantially straight and suspended over the substrate 515. Disposed underneath the distal end of the cantilever beam 503 are the transmission line 505 and its dielectric layer 509. The transmission line 505 is also formed on the substrate 515 and is typically a conductive material, such as aluminum, copper, polysilicon, or gold. As will be seen below, the dielectric layer 509 serves to separate the cantilever beam 503 and the transmission line when the switch is "on" to effectuate capacitive coupling.

Disposed on the substrate 515 and between the transmission line 505 and the anchor 513 is intermediate actuation electrode 507 and it's corresponding dielectric layer 511. Note that the height of the anchor is higher than that of the intermediate actuation electrode 507. Further, the height of the intermediate actuation electrode 507 is higher than that of the transmission line 505. As seen in FIG. 5A, the gap distance between the dielectric layer 509 and the cantilever beam 503 is denoted by distance D2. The distance between the dielectric layer 511 and the cantilever beam 503 is denoted by distance D1. In this embodiment, D2 is greater than D1.

Figure 5B:
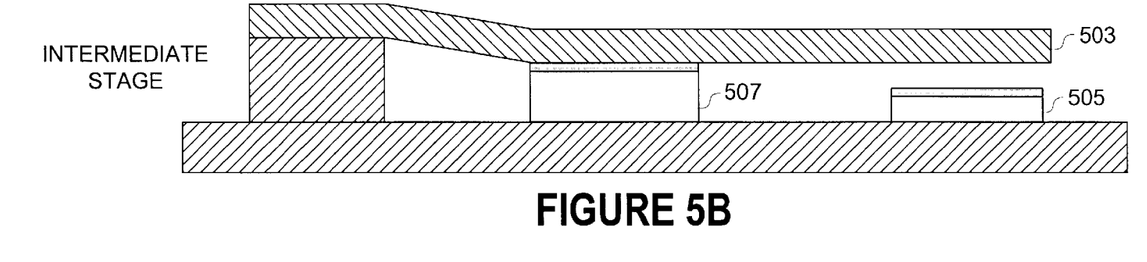

In operation, to turn the switch 501 to the "on" position, a DC actuation voltage is applied to the intermediate actuation electrode 507. Moreover, the transmission line 505 should be carrying a voltage signal. A DC actuation voltage is also applied between cantilever beam 503 and transmission line 505. The DC actuation voltage will not interfere with the AC signals carried on the transmission line 505. This is because a DC voltage cannot penetrate through the dielectric layer 509. However, AC signals will still be transmitted by capacitive coupling. These voltages on the actuation electrode 507 and the transmission line 505 tend to cause an electrostatic attraction between the cantilever beam 503 to the actuation electrode 507 and the transmission line 505. Because the distance D1 between the cantilever beam 503 and the actuation electrode 507 is relatively small, the electrostatic attraction force is sufficient to close the gap D1 between the intermediate actuation electrode 507 and the cantilever beam 503. This is shown in FIG. 5B. Once this happens, the gap between the cantilever beam 503 and the transmission line 505 is reduced (to D2−D1). By narrowing this gap, the electrostatic attraction force between the transmission line 505 and the cantilever beam 503 is then sufficient to close the gap between the cantilever beam 503 and the transmission line 505, thereby forming a capacitive connection between the transmission line and the cantilever beam 503.

The use of a two-step activation technique allows for the use of stiffer cantilever beams for the same activation voltage. The use of stiffer beams results in a higher resonance frequency, which in turn allows for higher switching speeds.

Figure 6A:
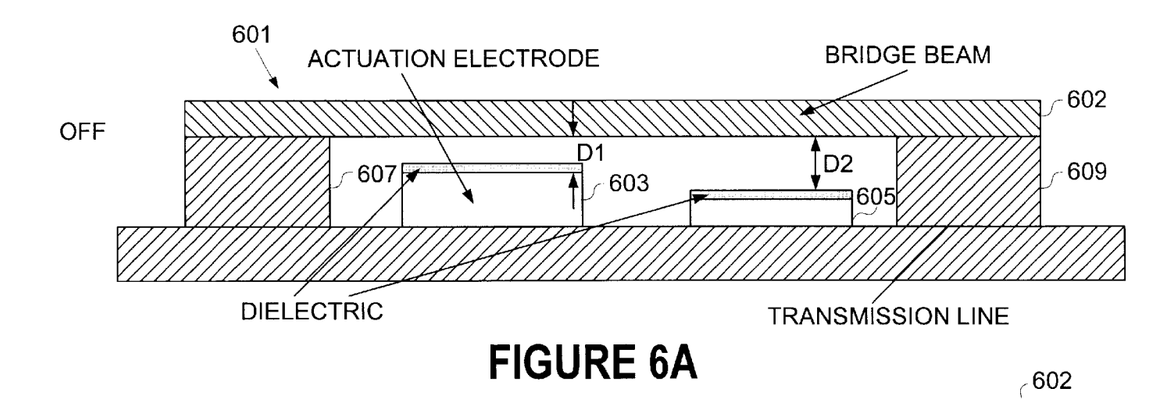
FIGS. 6A–C illustrates a bridge beam capacitive shunt MEMS switch formed in accordance with the present invention.
Figure 6B:
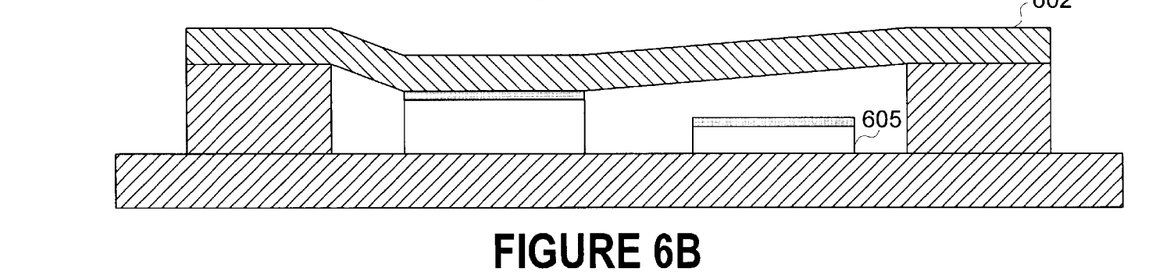
Figure 6C:
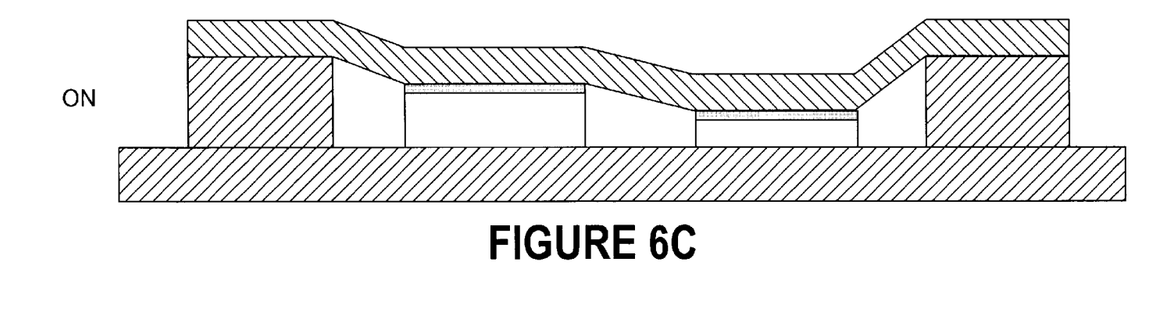

The concepts of the present invention can also be applied to other embodiments and types of MEMS switches. For example, a bridge beam shunt switch incorporating the present invention is shown in FIGS. 6A through 6C. The bridge beam shunt switch 601 is similar to that shown in FIG. 3 except that an intermediate actuation electrode is added. A bridge beam 602 is suspended above an intermediate actuation electrode 603 and a transmission line 605. The bridge beam 602 is suspended by means of anchors 607 and 609. The anchor in turn is secured to a substrate.

Typically, the bridge beam 602 and the anchors 607 and 609 are formed from polysilicon. Alternative materials may be used, but should preferably be easily formed using semiconductor processes and be conductive, such as copper or aluminum. Further, although not shown, the bridge beam 602 is connected to other circuitry that is selectively connectable to the transmission line 605 by means of the switch 601. In other words, the switch connects the transmission line 605 to other circuit elements when activated.

Figure 5C:
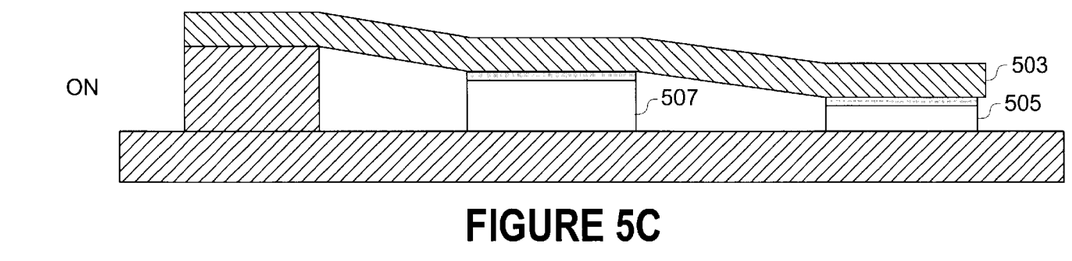

Further, formed on the top surface of the intermediate actuation electrode 603 and the transmission line 605 are thin dielectric layers (similar to those of FIGS. 5A–5C). As will be seen below, the dielectric layers serves to separate the bridge beam 602 and the transmission line 605 when the switch is "on" to effectuate capacitive coupling.

In the "off" position, the bridge beam 602 is suspended above the intermediate actuation electrode 603 and the transmission line 605. The distance between the intermediate actuation electrode 603 and the bridge beam 602 is denoted by distance D1. The distance between the transmission line 605 and the bridge beam 602 is denoted by distance D2. In this embodiment, D2 is greater than D1. To switch the shunt switch 601 on, a DC voltage is applied across both gaps D1 and D2. Gap D1 is closed first because the DC voltage on the intermediate actuation electrode 603 creates enough attraction force to close the gap D1. This is shown in FIG. 6B.

Once this happens, the gap between the bridge beam 602 and the transmission line 605 is reduced (to D2−D1). By narrowing this gap, the electrostatic attraction force between the transmission line 605 and the bridge beam 602 is then sufficient to close the gap between the bridge beam 602 and the transmission line 605, thereby forming a capacitive connection between the transmission line 605 and the bridge beam 602. Thus, in the "on" position, the switch appears as in FIG. 6C.

Figure 7A:
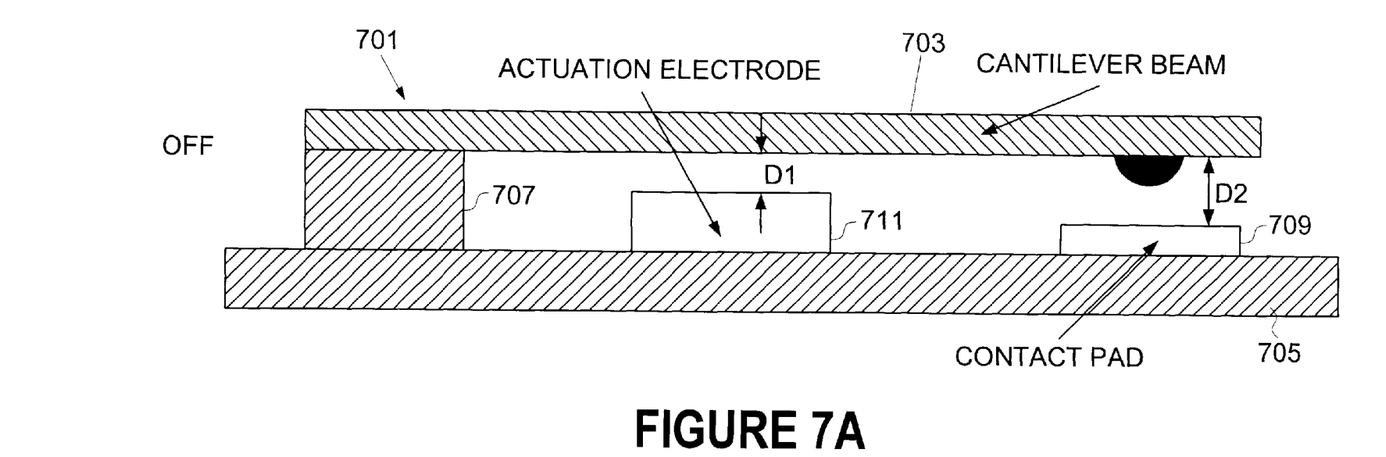
FIGS. 7A and 7B illustrates a cantilever contact MEMS switch formed in accordance with the present invention.
Figure 7B:
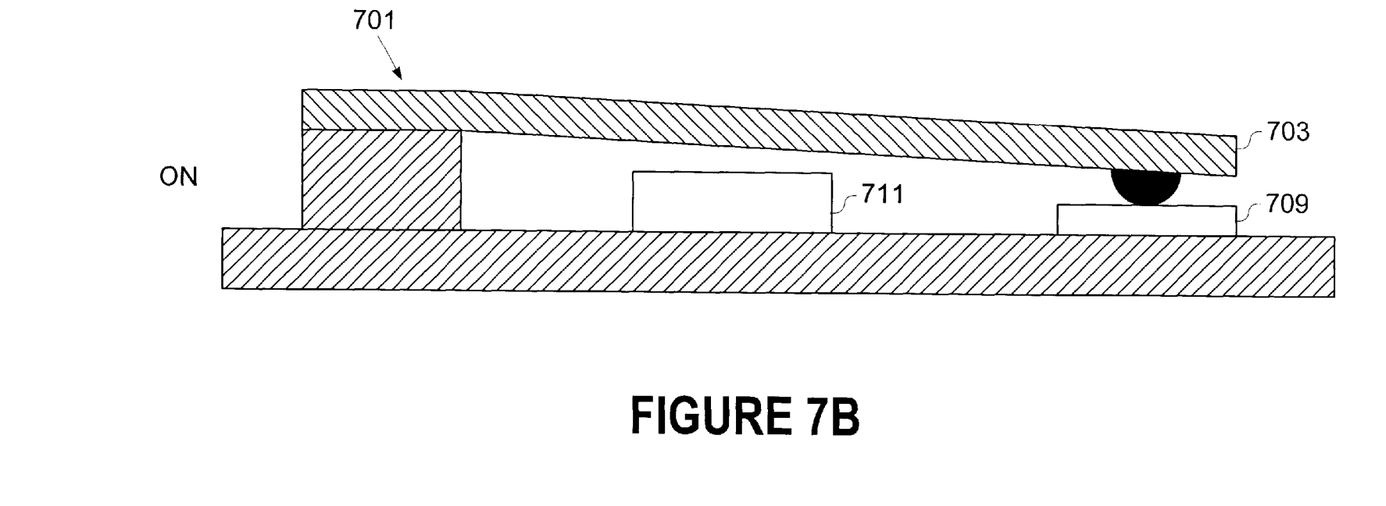

Turning to FIGS. 7A and 7B, a cantilever contact switch 701 is shown. The contact switch 701 includes a cantilever beam 703 suspended above a substrate 705 by means of an anchor 707. The cantilever beam 703 has one end (the proximal end) secured to anchor 707. The anchor in turn is secured to a substrate 705. Typically, the cantilever beam 703 and the anchor 707 are formed from polysilicon. Alternative materials may be used, but should preferably be easily formed using semiconductor processes and be conductive, such as copper or aluminum. Further, although not shown, the cantilever beam 703 is connected to other circuitry that is selectively connectable to a contact pad 709 by means of the switch 701. In other words, the switch connects the contact pad 709 to other circuit elements when activated.

The distal end of the cantilever beam 703 is left unsupported and is free to move downwardly. However, in its undisturbed state, the cantilever beam 703 is substantially straight and suspended over the substrate 705. Disposed underneath the distal end of the cantilever beam 503 is contact pad 709. The contact pad 709 is also formed on the substrate 705 and is typically a metal conductive material, such as aluminum or copper. Alternatively, the contact pad may be polysilicon.

Disposed on the substrate 705 and between the contact pad 709 and the anchor 707 is intermediate actuation electrode 711. Note that the height of the anchor 707 is higher than that of the intermediate actuation electrode 711. Further, the height of the intermediate actuation electrode 711 is higher than that of the contact pad 709. As seen in FIG. 7A, the gap distance between the contact pad 709 and the cantilever beam 703 is denoted by distance D2. The distance between the actuation electrode 711 and the cantilever beam 703 is denoted by distance D1. In this embodiment, D2 is greater than D1.

In operation, to turn the switch 701 to the "on" position, a voltage is applied to the intermediate actuation electrode 711. The voltage on the actuation electrode 711 tends to cause an electrostatic attraction between the cantilever beam 703 to the actuation electrode 711. Because the distance D1 between the cantilever beam 703 and the actuation electrode 711 is relatively small, the electrostatic attraction force is sufficient to reduce the gap between the intermediate actuation electrode 711 and the cantilever beam 703 until the cantilever beam 703 is in contact with the contact pad 709.

Figure 8A:
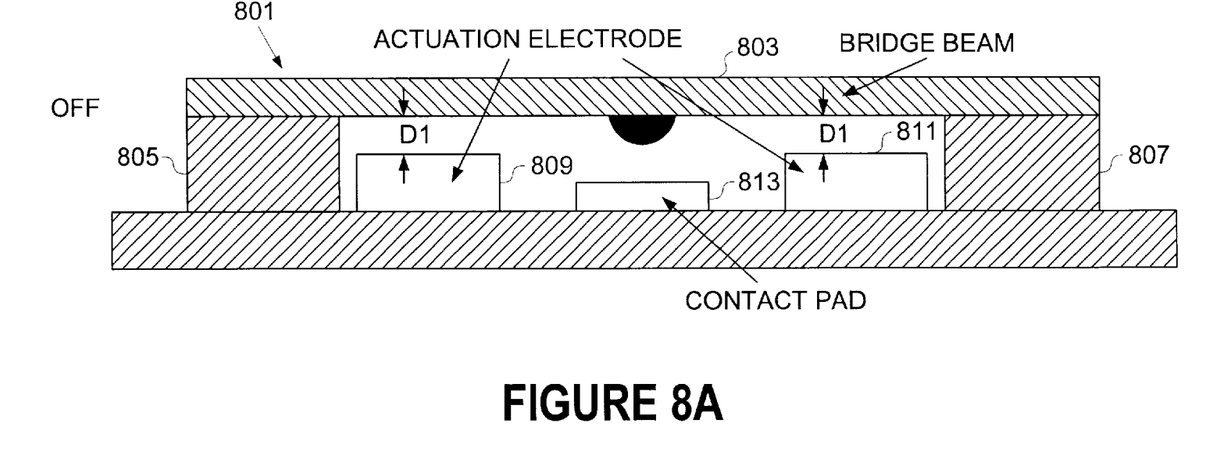
FIGS. 8A and 8B illustrates a bridge beam metal/metal contact MEMS switch formed in accordance with the present invention.
Figure 8B:
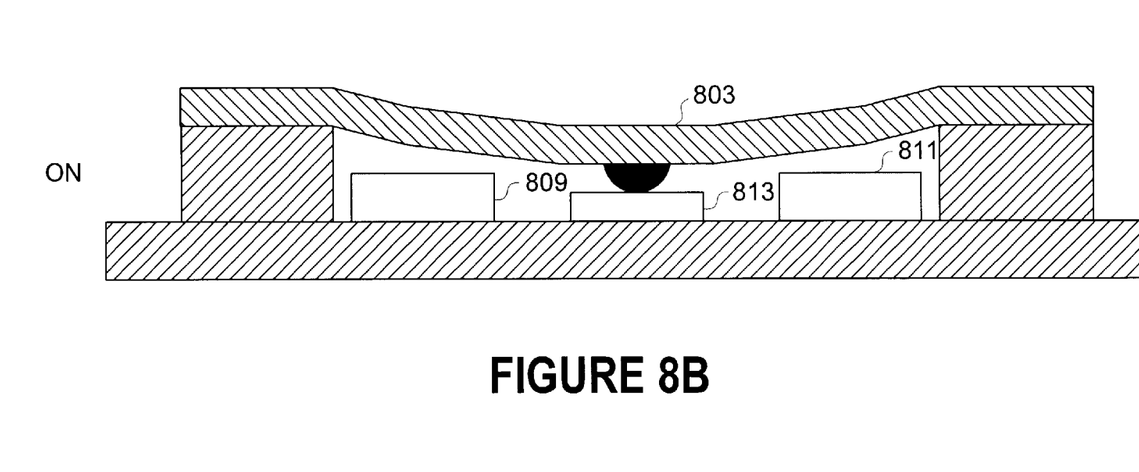

In yet another alternative embodiment, a bridge beam metal/metal contact switch 801 is seen in FIGS. 8A and 8B. A bridge beam 803 is suspended above an intermediate actuation electrodes 809 and 811 and a contact pad 813. The bridge beam 803 is suspended by means of anchors 805 and 807. The anchor in turn is secured to a substrate.

Typically, the bridge beam 803 and the anchors 805 and 807 are formed from polysilicon. Alternative materials may be used, but should preferably be easily formed using semiconductor processes and be conductive, such as copper or aluminum. Further, although not shown, the bridge beam 803 is connected to other circuitry that is selectively connectable to the contact pad 813 by means of the switch 801. In other words, the switch connects the contact pad 813 to other circuit elements when activated.

In the "off" position, the bridge beam 803 is suspended above the intermediate actuation electrodes 809 and 811 and the contact pad 813. In this embodiment, two intermediate actuation electrodes 809 and 811 are shown. However, any number of actuation electrodes may be used as design requirements may require. The distance between the intermediate actuation electrode 809 and 811 and the bridge beam 803 is denoted by distance D1.

To turn the switch 801 on, a DC voltage is applied to the actuation electrodes 809 and 811. Because the initial gap between the bridge beam 803 and the intermediate actuation electrodes 809 and 811 is much smaller, the DC voltage needed to bend the bridge beam is much less. Alternatively, for the same applied DC voltage, the bridge beam 803 may be made stiffer, resulting in a faster switch. The electrostatic attraction force generated is sufficient to draw the bridge beam 803 downwardly into contact with the contact pad 813. Preferably, the contact pad is formed from a metal material, such as aluminum or copper.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, while the bending beam and breathing bar types of mechanical resonators have been described, other types of mechanical resonators may also be substituted into the concepts and ideas of the present invention.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctorines of claim interpretation.

What is claimed is:

1. A switch comprising:
    a cantilever beam having a proximal end and a distal end, said cantilever beam supported by said proximal end above a substrate;
    an intermediate actuation electrode placed beneath said cantilever beam at a first distance from its proximal end and forming a first gap therebetween, to operate as a first actuation electrode; and
    a transmission line placed beneath said cantilever beam at a second distance from its proximal end and forming a second gap therebetween, to operate as a second actuation electrode.

2. The switch of claim 1 wherein said cantilever beam is formed from polysilicon.

3. The switch of claim 1 wherein said cantilever beam is supported by an anchor attached to said substrate.

4. The switch of claim 1 wherein said cantilever beam is electrically connected to circuit devices formed on said substrate.

5. The switch of claim 1 wherein said intermediate actuation electrode has a dielectric layer formed thereon.

6. The switch of claim 1 wherein said intermediate actuation electrode is placed on said substrate between said anchor and said transmission line.

7. The switch of claim 1 wherein said first distance is less than said second distance said first gap has a distance less than the distance of said second gap.

8. The switch of claim 7 wherein said intermediate actuation electrode is placed between said anchor and said transmission line.

9. The switch of claim 1 wherein said transmission line has a dielectric layer formed thereon.

10. The switch of claim 1 wherein the switch enables a signal carried on the transmission line to be capacitively-coupled to said cantilevered beam when the switch is activated.

11. The switch of claim 1 wherein the switch is activated by applying a DC voltage to the intermediate actuation electrode and the transmission line.

12. A microelectromechanical system (MEMS) switch comprising:

a polysilicon cantilever beam having a proximal end and a distal end, said cantilever beam supported by said proximal end above a substrate;

an intermediate actuation electrode placed beneath said cantilever beam at a said intermediate actuation electrode a first distance beneath said cantilever beam; and a contact pad placed beneath said cantilever beam, said contact pad a second distance beneath said cantilever beam.

13. The MEMS switch of claim 12 wherein said cantilever beam is supported by an anchor attached to said substrate.

14. The MEMS switch of claim 13 wherein said intermediate actuation electrode is placed on said substrate between said anchor and said contact pad.

15. The MEMS switch of claim 12 wherein said first distance is less than said second distance.

16. The MEMS switch of claim 15 wherein said intermediate actuation electrode is placed between said anchor and said transmission line.

17. The MEMS switch of claim 12 wherein said cantilever beam is electrically connected to circuit devices formed on said substrate.

18. A switch comprising:

a bridge beam supported above a substrate by at least two anchors;

an intermediate actuation electrode placed beneath said bridge beam between said two anchors, said intermediate actuation electrode a first distance beneath said bridge beam and to operate as a first actuation electrode; and a transmission line placed beneath said bridge beam between said two anchors, said transmission line a second distance beneath said bridge beam and to operate as a second actuation electrode.

19. The switch of claim 18 wherein said bridge beam is electrically connected to circuit devices formed on said substrate.

20. The switch of claim 18 wherein said intermediate actuation electrode has a dielectric layer formed thereon.

21. The switch of claim 18 wherein said first distance is less than said second distance.

22. The switch of claim 18 wherein said transmission line has a dielectric layer formed thereon.

23. The switch of claim 18 further comprising a second intermediate actuation electrode placed beneath said bridge beam between said two anchors, said second intermediate actuation electrode a third distance beneath said bridge beam.

24. The switch of claim 23 wherein said first distance is the same as said third distance.

25. The switch of claim 18 wherein said bridge beam is formed from polysilicon.

26. The switch of claim 18, wherein said switch may be activated by supplying voltages to said intermediate actuation electrode and said transmission line and activation of said switch enables signals to be capacitively-coupled between said transmission line and said bride beam.

27. A microelectromechanical system (MEMS) switch comprising:

a cantilever beam having a proximal end and a distal end, said cantilever beam supported by said proximal end above a substrate;

an intermediate actuation electrode placed beneath said cantilever beam at a said intermediate actuation electrode a first distance beneath said cantilever beam; and a polysilicon contact pad placed beneath said cantilever beam, said contact pad a second distance beneath said cantilever beam.

* * * * *